2,973,279
SEALING COMPOSITIONS

William A. Weidenbenner, East St. Louis, Ill., and Lawrence A. Balling, St. Louis, Mo., assignors, by mesne assignments, to American-Marietta Company, Chicago, Ill., a corporation of Illinois No Drawing. Filed Dec. 27, 1954, Ser. No. 477,954

5 Claims. (Cl. 106—269)

This invention relates to sealing composition, and more particularly to sealing compositions which will harden or set while hot.

Briefly, the invention is directed to a sealing composition comprising a gilsonite having a melting point greater than approximately 325° F., a naphthenic oil having certain specified properties, and a grease which is resistant to flow at high temperatures.

Among the several objects of the invention may be noted the provision of sealing compositions, particularly for making seals of extensive width between metal parts such as are used in automobiles, which compositions will set while hot; the provision of sealing compositions of the class described which will not set at ordinary temperatures and therefore, which can be premixed and, are package-stable; the provision of sealing compositions of this class which are nonflowable when cold, but which when heated flow to form a thin adhesive film before setting; the provision of sealing compositions of this type which may be conveniently pumped by conventional means; and the provision of such sealing compositions which are useful to effect seals having a strong adhesion to metal and which exhibit good waterproofing and rustproofing properties. Other objects and features will be in part apparent and in part pointed out hereinafter.

The invention accordingly comprises the products hereinafter described, the scope of the invention being indicated in the following claims.

Although asphaltic sealing compositions, such as those described in United States Reissue Patent 19,381, for use in sealing joints of extensive widths are satisfactory in most respects, these compositions set or harden cold and therefore must be mixed on the job. The present invention provides sealing compositions which may be premixed and are package-stable throughout ordinary temperature ranges but which set upon being heated. The compositions of the present invention are particularly useful in effecting improved seals of extensive width between metal parts, for example, used in automobiles. When employed for this purpose, the heat necessary to cause the compositions to set is conveniently supplied by the baking oven in which the automobile paint is dried. Upon being heated in such a baking oven, a sealing composition of the invention flows to form a thin sealing layer covering a relatively large area, and then sets while still hot. The resulting film between the parts sealed is characterized by strong adhesion to metal and improved waterproofing and rustproofing properties.

In accordance with the present invention, a sealing composition having the above-noted desirable properties has been found to comprise a gilsonite having a melting point greater than approximately 325° F., a naphthenic oil having certain specified properties set forth more fully hereinafter and a high temperature grease. Optionally, the sealing compositions of the present invention may also contain a filler and a plasticizer.

With respect to the gilsonite component of these sealing compositions, any gilsonite having a melting point greater than 325° F., such as that sold under the trade designation "Barber Gilsonite, Grade E Select, 330," is suitable for use. If lower melting-point gilsonites are employed, the resulting compositions may not be package-stable. For use in the present invention, the gilsonite should be pulverized until it will pass through a 48 mesh screen or a finer mesh screen. Preferably approximately 90% of the gilsonite should pass through a 100 mesh screen.

The naphthenic oil component of these novel sealing compositions is a mixture of cyclic hydrocarbons of the general formula $C_nH_{2n}$ containing a high percentage of saturated cyclic hydrocarbons. The naphthenic oils suitable for use in this invention are characterized by the following properties:

Specific gravity
   (60/60° F.) _____ 9.2 to 9.4.
Viscosity _____ 100 to 2600 (S.U. at 100° F.), 35 to 105 (S.U. at 210° F.).
Pour point _____ −30 to +5° F.

Exemplary of naphthenic oils which may be employed are those sold under the trade designations "Coastal 1200″ Oil" (marketed by Cities Service Oil Co.) and "Lab. No. 10125" (marketed by Socony-Vacuum Oil Co., Inc.). It is to be understood that other naphthenic oils possessing the above-noted properties may also be used.

In general, any high temperature grease, i.e., a grease stable or resistant to flow at high temperatures may be utilized in the practice of the invention. It is preferred that the grease be resistant to flow at temperatures in excess of approximately 240° F. such as are encountered in the baking ovens employed for paint-drying purposes in the automotive industry. An illustrative high temperature grease is one known as lime soap grease which is sold by Socony-Vacuum Oil Co., Inc. under the trade designation "Sovarex No. 1." Another exemplary grease for use in the present invention is a grease consisting of 15 parts by weight of dimethyldioctadecyl ammonium bentonite (sold under the trade designation "Bentone 34" by National Lead Company) and 85 parts by weight of a naphthenic oil having the properties specified above. Also useful is a grease consisting of 15 parts by weight of "Bentone 18C," 7 parts by weight of ethanol and 85 parts by weight of a naphthenic oil as specified above. "Bentone 18C" is an organic derivative of a hydrous aluminum silicate sold under this trade designation by the National Lead Company. In place of "Bentone 34" and "Bentone 18C" in these latter two greases, either hydrated calcium silicate or precipitated calcium carbonate may be used. The hydrated calcium silicate should be of fine particle size (average 0.030 micron), such as that sold under the trade designation "Silene EF" by Columbia Chemical Division of Pittsburgh Plate Glass Company. If precipitated calcium carbonate is employed, it should have an average particle size of 0.05 to 0.06 micron, such as that sold under the trade designation "Multifex MM" by Diamond Alkali Co. It will be understood that other high-temperature greases are also useful in the practice of the invention.

Among the fillers which may be included in the compositions of the invention may be mentioned asbestos floats, calcium carbonate, aluminum silicate, magnesium silicate and hydrated calcium silicate, such as that sold under the trade designations "Silene EF" and "Silene L." Plasticizers which may be used include polybutene (molecular weight, approximately 1500), powdered reclaim rubber, GRS rubber dissolved or partially dissolved in a naphthenic oil having the properties set forth above, and depolymerized natural rubber in a liquid form. The inclusion of a plasticizer improves the low temperature flexibility of the compositions.

The preferred percentage-by-weight ranges for the components of these novel sealing compositions are as follows: gilsonite 25–50%; naphthenic oil, 25–50%; high-temperature grease, 5–20%; filler, 0–15% and plasticizer, 0–10%.

The following examples illustrate the invention.

*Example 1*

A sealing composition was prepared having the following composition:

| Component | Percent by Weight |
|---|---|
| Gilsonite (sold under the trade designation "Barber Gilsonite, Grade E Select, 330") | 35.8 |
| Naphthenic Oil (sold under the trade designation "Coastal 1200″ Oil") | 43.0 |
| High-temperature grease (sold under the trade designation "Sovarex No. 1") | 9.2 |
| Asbestos floats | 11.2 |
| Polybutene (mol. wt., approx. 1500) | 0.8 |

*Example 2*

A sealing composition was prepared having the following composition:

| Component | Percent by Weight |
|---|---|
| Gilsonite (sold under the trade designation "Barber Gilsonite, Grade E Select, 330") | 45.0 |
| Naphthenic Oil (sold under the trade designation "Coastal 1200″ Oil") | 43.0 |
| High-temperature grease (sold under the trade designation "Sovarex No. 1") | 12.0 |

*Example 3*

A sealing composition was prepared having the following composition:

| Component | Percent by Weight |
|---|---|
| Gilsonite (sold under the trade designation "Barber Gilsonite, Grade E Select, 330") | 50.0 |
| Naphthenic Oil (sold under the trade designation "Coastal 1200″ Oil") | 30.0 |
| High-temperature grease (sold under the trade designation "Sovarex No. 1") | 20.0 |

*Example 4*

A sealing composition was prepared having the following composition:

| Component | Percent by Weight |
|---|---|
| Gilsonite (sold under the trade designation "Barber Gilsonite Grade E Select, 330") | 30.0 |
| Naphthenic Oil (sold under the trade designation "Coastal 1200″ Oil") | 50.0 |
| High-temperature grease (sold under the trade designation "Sovarex No. 1") | 20.0 |

The compositions may be prepared in a single-blade dough mixer, a double sigma blade dough mixer (Werner Pfliederer type) or a Ribbon mixer. Approximately one-half of the naphthenic oil is added to the mixer, and the gilsonite, high-temperature grease, plasticizer and filler are thereafter added while the mixer is running. A thick paste is formed and is allowed to mix until all lump and particle agglomerates are milled out. The remaining amount of oil is then added and the composition is further mixed one-half to three hours depending upon the size of the batch. It is preferred that the mixer be equipped with a water jacket to conduct away any heat that may be built up in the sealing composition during mixing.

Since the compositions of the invention will not set or harden at ordinary temperatures, they may be conveniently premixed as described above and shipped and stored in drums or the like. In storage, they remain package-stable and are capable of withstanding temperatures up to 130° F. for a reasonable length of time. Further, when a plasticizer is included, the composition is of such consistency that it may readily be pumped at ordinary room temperatures by conventional means such as, for example, a barrel pump.

On the job, the composition may be pumped and thickly spread on or applied to the surface to be sealed. As previously mentioned, the composition is nonflowable at ordinary temperatures up to 130° F. At these temperatures, the naphthenic oil has very little affinity or solvent action toward gilsonite. However, when the composition is heated, the gilsonite softens and this affinity is increased, the naphthenic oil now exerting a solvent action on the gilsonite. As heating continues, the gilsonite fluxes with the oil and the grease, and the composition becomes flowable. The high temperature grease acts as a gelling agent for the dissolved gilsonite, and the composition continues to flow until the gilsonite is substantially completely in solution and the gelling is complete. When this has occurred, the composition hardens and sets up as a rubbery homogeneous mass which is somewhat like a gel. The composition then ceases to flow. The time of flow is dependent upon the time required for the composition to set or harden, which in general is more or less proportionate to the time required for the gilsonite to be substantially completely dissolved. Thus, in practice, a thick mass of the composition, when heated, will flow down a vertical surface to form a relatively thin layer before setting to the point where it becomes nonflowable. Even when flowing, the composition is still viscous enough so that it will bridge a small opening (e.g. a ³⁄₁₆ in. diameter hole) without any appreciable dripping through the opening.

Although the sealing compositions of the invention are useful in any application where the package-stable, hot-setting properties are desirable, they are particularly useful in effecting seals of extensive width between metal parts in the manufacture of automobiles. The compositions are useful through the range of temperatures, i.e., 240° F.–375° F., generally encountered in baking ovens employed for drying automobile paint. Accordingly, the sealing operation may be effected simultaneously with paint drying, the heat necessary to cause these compositions to harden being conveniently supplied by the baking oven. The relatively thin film which results upon the setting or hardening of these compositions is strongly adhesive to metals and exhibits good waterproofing and rust-proofing properties.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

We claim:
1. A sealing composition comprising between approximately 25% by weight and 50% by weight of a gilsonite having a melting point greater than approximately 325° F., between approximately 25% by weight and 50% by weight of a naphthenic oil having the following properties:

Specific gravity (60/60° F.) __ 9.2 to 9.4.
Viscosity _____ 100 to 2600 (S.U. at 100° F.), 35 to 105 (S.U. at 210° F.).
Pour point _____ −30 to +5° F.

and between 5% by weight and 20% by weight of a grease resistant to flow at temperatures above approximately 240° F.

2. A sealing composition comprising approximately 45% by weight of a gilsonite having a melting point greater than approximately 325° F., approximately 43% by weight of a naphthenic oil having the following properties:

Specific gravity (60/60° F.)__ 9.2 to 9.4.
Viscosity _____ 100 to 2600 (S.U. at 100° F.), 35 to 105 (S.U. at 210° F.).
Pour point_____ −30 to +5° F.

and approximately 12% by weight of a grease resistant to flow at temperatures greater than approximately 240° F.

3. A sealing composition comprising approximately 50% by weight of a gilsonite having a melting point greater than approximately 325° F., approximately 30% by weight of a naphthenic oil having the following properties:

Specific gravity (60/60° F.)__ 9.2 to 9.4.
Viscosity _____ 100 to 2600 (S.U. at 100° F.), 35 to 105 (S.U. at 210° F.).
Pour point_____ −30 to +5° F.

and approximately 20% by weight of a grease resistant to flow at temperatures greater than approximately 240° F.

4. A sealing composition comprising approximately 30% by weight of a gilsonite having a melting point greater than approximately 325° F., approximately 50% by weight of a naphthenic oil having the following properties:

Specific gravity (60/60° F.)__ 9.2 to 9.4.
Viscosity _____ 100 to 2600 (S.U. at 100° F.), 35 to 105 (S.U. at 210° F.).
Pour point_____ −30 to +5° F.

and approximately 20% by weight of a grease resistant to flow at temperatures greater than approximately 240° F.

5. A sealing composition comprising approximately 35.8% by weight of a gilsonite having a melting point greater than approximately 325° F., approximately 43% by weight of a naphthenic oil having the following properties:

Specific gravity (60/60° F.)__ 9.2 to 9.4.
Viscosity _____ 100 to 2600 (S.U. at 100° F.), 35 to 105 (S.U. at 210° F.).
Pour point_____ −30 to +5° F.

approximately 9.2% by weight of a grease resistant to flow at temperatures greater than approximately 240° F., approximately 11.2% by weight of asbestos floats and approximately 0.8% by weight of a polybutene having a molecular weight of approximately 1500.

References Cited in the file of this patent

UNITED STATES PATENTS

| | | |
|---|---|---|
| 2,131,085 | Anderton | Sept. 27, 1938 |
| 2,308,245 | Ortynsky | Jan. 12, 1943 |
| 2,470,141 | Caves | May 17, 1949 |
| 2,649,384 | Anderson | Aug. 18, 1953 |

FOREIGN PATENTS

| | | |
|---|---|---|
| 652,801 | Great Britain | May 2, 1951 |